Patented Jan. 15, 1935

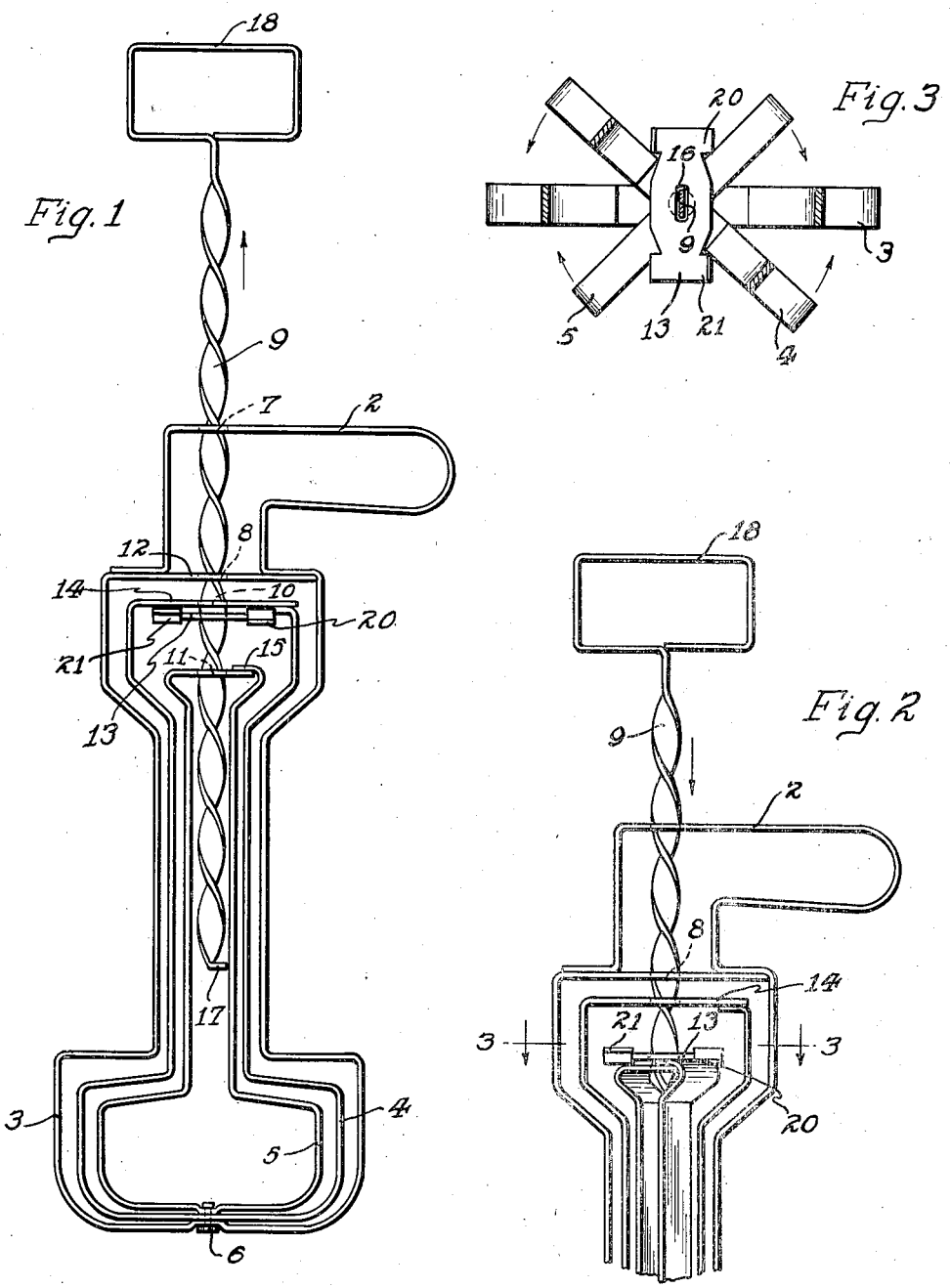

1,987,700

UNITED STATES PATENT OFFICE 1,987,700

EGG BEATER MECHANISM

Herbert H. Muir, Chicago, Ill.

Application August 11, 1933, Serial No. 684,662

5 Claims. (Cl. 259—132)

This invention relates to manually operated devices for beating eggs or whipping cream and the like, but the particular mechanical arrangement employed for producing continuous rotary motion of a driven member by means of a reciprocating driving member is useful in many other connections.

An object of the invention is to utilize a common form of helically grooved or twisted reciprocating drive member for imparting continuous rotation to a driven element for beating purposes and thus avoid the necessity of overcoming the inertia in a beater construction wherein the beating element is first rotated in one direction and then in the other.

Another object of the invention is to provide an improved means for transmitting motion between a reciprocating drive member and oppositely rotated driven elements.

A further purpose of the invention is to provide an egg beater construction formed substantially entirely of strip stock of uniform cross section and so arranged that all elements thereof may be relatively positioned into a compact and flat structure which is convenient for packing a number of the devices into a small space.

The objects of the invention are accomplished by means of a construction such as is illustrated in the drawing, wherein:

Figure 1 shows the construction in elevation.

Fig. 2 is a fragmentary view of the device in elevation as it would appear with the actuator moving in the opposite direction to that indicated in Figure 1.

Fig. 3 is a sectional detail on the plane indicated by the line 3—3 of Fig. 2.

The invention is illustrated as an egg beater and for this purpose the reciprocating helical drive member may be formed from a strip of metal bent at one end into an operating handle and having extending therefrom a shank which is twisted into a helix. A frame structure of similar material provides the stationary bearings for the reciprocating driving element and a plurality of beaters also formed from strips of flat stock are pivoted to the frame to rotate thereon. The beaters have a rotary motion imparted thereto by intermittent impulses which are always in the same direction with reference to each beater. One beater, however, is continuously driven in one direction, while another beater is continuously driven in the opposite direction. Thus by this arrangement it is not necessary to waste effort by overcoming the inertia of a rotating beater and reversing its direction as is common in devices of the same general class.

The drawing which illustrates the invention shows a frame structure 1 formed of flat stock and shaped to afford a grip 2 at the upper end and a guard 3 at the lower end. The guard encircles the rotary beating elements 4 and 5 which are centered with the frame by means of a pivot 6 around which the beaters rotate.

The frame 1 has circular apertures 7 and 8 to afford bearings for a beater driving helix 9. The helix 9 also passes through circular apertures 10 and 11 in upper transversely extending portions of the beaters 4 and 5. Thus the helix 9 provides an upper bearing for the beaters adjacent a bearing for the helix provided by the cross member 12 of frame 1.

In order to impart rotary motion to the beaters, an actuator or driving element 13 for the latter is located between the transversely extending parts 14 and 15 at the upper ends of the beaters and which have the apertures 10 and 11. The driver 13 has a central aperture 16 of substantially rectangular form to conform with a transverse section of helix 9. The screw or helix 9 may be formed in various ways, but, as shown, is made by twisting a strip of metal, but at one end the strip of metal is bent to provide a stop flange 17 to limit the upward stroke of the helical driving member and at its opposite end an untwisted portion of this member is bent into the handle form 18.

The intermediate drive member between the helix and the driven beaters is formed to have flanges or wings 20 and 21 for alternately engaging the cross members 14 and 15 of the beaters. Due to the slot 16 in the intermediate drive member 13 conforming to the helix which passes through it, it is necessary for the intermediate drive member either to reciprocate with the helix or rotate thereon whenever the helix is reciprocated within the frame structure 1.

Upon an upstroke of the helix, the intermediate driver moves upwardly with the helix until stopped by the cross member 14 of the beater. Then the intermediate driver must rotate, upon continued motion of the helix in the same direction, and a wing of the driver engages the cross member 14 of the beater 4 and imparts rotary motion to the latter. The wings 20 and 21 of the intermediate drive member are inclined to permit a driven beater to overrun the intermediate drive member when the driving screw or helix reaches the end of a stroke.

Upon a downstroke of the helix, the beater 4 may continue to rotate in the same direction under the momentum imparted to it through the intermediate driver 13, but the latter must move down with the helix until stopped by engagement with the cross member 15 of beater 5. Then the intermediate drive member is forced to rotate the beater 5 in a direction opposite to the direction or rotation of beater 4. Upon continued reverse strokes of the helix 9, each beater receives successive impulses from the intermediate driving member, tending to maintain a unidirectional rotation of the egg beater.

The intermediate drive member 13 first rotates in one direction and then in the other but maintains continuous opposite rotation of the beaters by the successive impulses imparted thereto.

As soon as the axial movement of the driving screw ceases as at either end of its stroke, the continued rotation of the beater with which it has had contact causes the driving member 13 to continue its rotation to a limited extent and forces it out of contact with the respective beater so that the latter is free to overrun the rotation of the driving member and this action, together with friction between the driving member and screw, helps to carry the driving member into engagement with the other beater on reversal of the axial movement of the screw as it is reciprocated in the normal operation of the device. Thus both beaters rotate continuously in their respective directions throughout the entire beating operation.

As illustrated, except for the pivot, the entire construction is formed from strips of flat stock which are rectangular in cross section. Many other forms of stock would be suitable for the same construction, although not always as cheap. Whatever the material may be, the improved construction has a distinguishing characteristic in the nested arrangement of its elements. When laid flat all parts of the construction assume the nested arrangement, as shown in Fig. 1 of the drawing; that is, rotor 5 lays within rotor 4, and rotor 4 within the frame 1, all in graduated order. In one dimension the thickness of the instrument at any one point does not exceed the width of the stock from which it is formed. A large number of devices, therefore, may be compactly packed together in shipping cases. Also, the individual device may be laid flat in a drawer. The construction is also easy to clean by turning the rotors or beaters at right angles to each other and to the frame.

Although but one specific embodiment is herein shown and described, it is to be understood that the details as set forth may be altered or omitted without departing from the invention as defined by the following claims.

I claim:

1. In a construction of the class described, a reciprocable helical drive member, an intermediate drive member fitting said helical drive member so as either to reciprocate therewith or rotate thereon if prevented from reciprocating, a pair of driven rotary members positioned to act as stops for the intermediate drive member and compel its rotation under action of the reciprocating helix and to receive rotational impulses from said intermediate drive member, and a frame structure for supporting said driven elements and guiding the helix.

2. In a construction of the class described, a frame structure, a helix mounted in said frame structure for reciprocating motion therein, an intermediate drive member fitted to said helix so as to move therewith in its reciprocating motion or be rotated thereby if stopped, and a rotor pivotally mounted on said frame structure in position to be engaged by said intermediate drive member and act as a stop therefor and for receiving rotary impulses from said intermediate drive member.

3. A device of the class described, comprising a frame, a screw axially slidable in said frame, a driver on said screw and movable therewith, a pair of rotors mounted to rotate independently of each other about the axis of said screw and having parts respectively located at opposite sides of said driver, said driver being movable into and out of engagement with said parts alternately for driving said rotors in respectively opposite directions through the longitudinal reciprocation of said screw.

4. A device of the class described, comprising a frame, a screw axially slidable in said frame, a driver on said screw and movable therewith, a pair of rotors mounted to rotate independently of each other about the axis of said screw and having parts respectively located at opposite sides of said driver, said driver being movable into and out of engagement with said parts alternately and having oppositely disposed ratchet lugs at opposite sides thereof for driving said rotors in respectively opposite directions through the longitudinal reciprocation of said screw.

5. A construction of the class described comprising a support, a screw mounted for longitudinal reciprocation on said support, a pair of beating elements rotatably mounted on said support, actuating means for the beating elements which is reversely driven on opposite strokes of said screw, said actuator being arranged to impart rotary impulses one way to one of said beating elements by one direction of stroke of the screw and the opposite way to the other of said beating elements by the opposite direction of stroke of the screw whereby said beating elements may be continuously rotated in opposite directions.

HERBERT H. MUIR.